No. 814,637. PATENTED MAR. 6, 1906.
W. E. BEYER.
FASTENER FOR GLASS JOINTS.
APPLICATION FILED OCT. 21, 1905.

WITNESSES
Martin Koster
Elsie Eibler

INVENTOR
William E. Beyer
BY B. F. Eibler
Atty.

UNITED STATES PATENT OFFICE.

WILLIAM E. BEYER, OF CLEVELAND, OHIO, ASSIGNOR TO MARTIN KOSTER, OF CLEVELAND, OHIO.

FASTENER FOR GLASS JOINTS.

No. 814,637.

Specification of Letters Patent.

Patented March 6, 1906.

Application filed October 21, 1905. Serial No. 283,779.

*To all whom it may concern:*

Be it known that I, WILLIAM E. BEYER, a citizen of the United States of America, and a resident of Cleveland, county of Cuyahoga, and State of Ohio, have invented certain new and useful Improvements in Fasteners for Glass Joints, of which the following is a specification.

My invention relates to improvements in fasteners for the glass joints of show-windows, show-cases, &c.; and the object of my improvement is to provide a fastener which efficiently and reliably serves as a binding medium of and for joining glasses, but which in no way has any part or parts thereof extending into or through the glass proper, in consequence whereof the glass is not exposed to strains which are prevalent in brackets of the ordinary construction. I attain this object in and with a fastener constructed substantially as shown in the accompanying drawings, in which—

Figure 1:
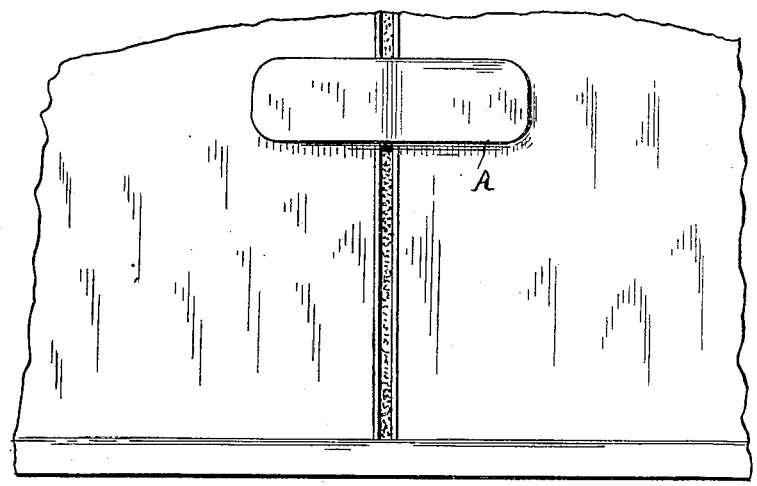
Figure 4:
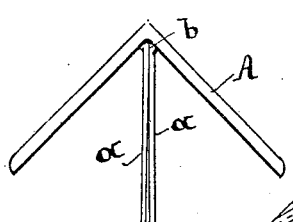
Figure 2:
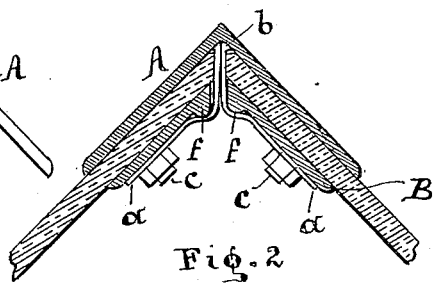
Figure 3:
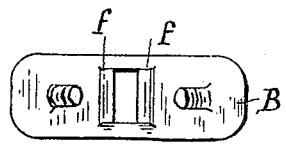
Figure 5:
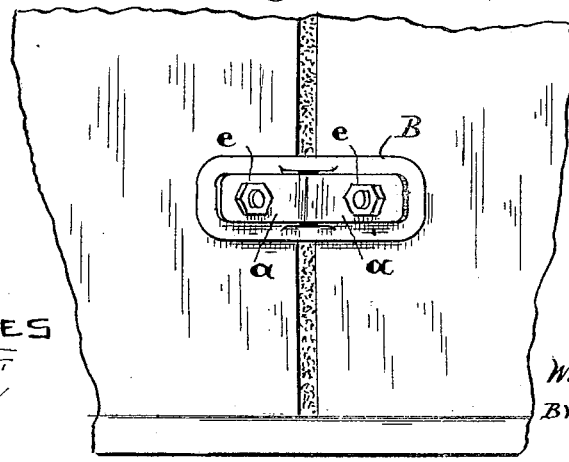

Figure 1 represents a partial elevational view of a so-called "all-glass" show-window front. Fig. 2 is a horizontal sectional view of the same. Fig. 3 is an inner face view of a glass front and brackets. Fig. 4 represents a plan view of the outer part of said fastener. Fig. 5 is a face view of the inner part of said fastener.

Like letters of reference denote like parts in the drawings and specification.

Substantially this fastener comprises a pair of brackets and novel means whereby a secure connection can be established of the brackets and the joining glasses between them. The outer bracket consists of the angle-piece A, which has a pair of pliable members $a$ $a$, projecting from the inner corner $b$ thereof. Said members may be secured to the bracket proper in any suitable manner. As shown, they are supposed to be "hard-soldered" to said bracket, which form is preferable for obvious reasons. Near their outer terminals said members are perforated or slotted for reception of the studs $c$ $c$. (See Figs. 2 and 3.) The inner bracket of said fastener consists of the angle-piece B. (See Figs. 2, 3, and 5.) Said bracket is slotted, as at $d$, and provided with inwardly-projecting screw-threaded studs $c$ $c$ and nuts $e$ $e$ and lugs $f$ $f$. Obviously bolts with countersunk heads may be employed in place of the studs.

In all-glass show-windows the glasses generally form a miter or beveled joint, leaving a gab between, which is filled with cement, except where the members $a$ $a$ extend through said gab.

The members $a$ $a$ are of such thin pliable material, so that no extra room need be provided for them, they simply and freely passing through the gab above mentioned.

Fasteners as above described are applied as follows: First of all cement is applied upon those surfaces of the bracket which bear against the glasses. In placing the outer bracket in position the protruding members $a$ $a$ thereof will extend through the gab between the glasses. Thence the inner bracket is slipped over said members and afterward the members are bent or spread, so as to bear against the inner bracket, with the studs $c$ $c$ extending through the slots of the parts $a$ $a$, whereupon the nuts $e$ $e$ are applied to maintain the brackets in secure position. In flattening the members $a$ $a$ over the lugs $f$ $f$ a pulling action is exerted upon said members as soon as the nuts become seated against said members, and as a result a tight and strong clamp being formed.

From the foregoing it can be readily seen and understood that owing to the absence of screws and screw-holes no shearing strains can be exerted upon the glass. Fasteners of the above description are therefore infinitely safer than those which project into or through the glass, and aside from this they can be much more readily applied, and the tedious labor of drilling or notching the glass is eliminated.

What I claim, and desire to secure by Letters Patent, is—

1. A fastener for glass joints in show-windows and the like, comprising an outer bracket having perforated leaf members extending therefrom through the gab between the glasses and an inner slotted bracket receiving said leaf members and having lugs and screw-threaded studs with nuts protruding from its inner face for the purpose of clamping said leaf members in the manner as shown and set forth.

2. A fastener for the joints of "all-glass" show cases, windows, &c., comprising a bracket placed on the outside of the glasses, said bracket having perforated leaf members, which extend through the gab of the joining glasses, and an inner bracket having a slot in the corner thereof and screw-threaded studs with nuts at or near its terminals, the said slot engaging said leaf members and the studs with nuts retaining said members in spread condition for the purpose of binding the glasses by and with said brackets.

WILLIAM E. BEYER.

Witnesses:
BERNHARD F. EIBLER,
MARTIN KOSTER.